United States Patent [19]
Bundy

[11] 3,848,416
[45] Nov. 19, 1974

[54] POWER GENERATING PLANT WITH NUCLEAR REACTOR/HEAT STORAGE SYSTEM COMBINATION

[75] Inventor: Francis P. Bundy, Scotia, N.Y.

[73] Assignee: General Electric Company, Schenectady, N.Y.

[22] Filed: May 23, 1973

[21] Appl. No.: 363,139

[52] U.S. Cl. .................... 60/644, 60/652, 60/659, 60/676
[51] Int. Cl. ....................... F01k 23/00, F01k 23/10
[58] Field of Search .................... 60/108, 36, 38, 49

[56] References Cited
UNITED STATES PATENTS
2,593,963   4/1952   Biggs.......................................... 60/38

FOREIGN PATENTS OR APPLICATIONS
282,773     7/1929    Great Britain........................ 60/26
718,175     5/1963    Canada................................... 60/26
1,242,627   8/1971    Great Britain........................ 60/38
1,910,137   10/1970   Germany............................... 60/38
2,036,288   4/1971    Germany............................... 60/38

Primary Examiner—Edgar W. Geoghegan
Assistant Examiner—H. Burks, Sr.
Attorney, Agent, or Firm—Leo I. MaLossi; Joseph T. Cohen; Jerome C. Squillaro

[57] ABSTRACT

Excess heat output of a nuclear reactor is stored at high temperature. This stored heat is then used to generate steam to operate a turbine-generator during high power demand periods. An arrangement is described herein in which a fluoride salt fusion heat storage system is used from which heat is retrieved by circulating liquid lead therethrough. The liquid lead heat retrieval circuit includes a steam boiler in which steam for operation of a turbine-generator is generated using heat extracted from the heated liquid lead.

20 Claims, 2 Drawing Figures

POWER GENERATING PLANT WITH NUCLEAR REACTOR/HEAT STORAGE SYSTEM COMBINATION

BACKGROUND OF THE INVENTION

Power generating plants employing high-temperature nuclear reactors have high initial costs per unit of power. In large part this is true, because of the high initial cost of the nuclear reactors themselves. It is most desirable to be able to operate such nuclear reactors at constant full-rated load in order to increase the practical fuel service life of the reactor as well as to optimize the operation and most effectiveness thereof. Unfortunately, power generating stations supplying power to public electric networks are subject to widely varying power loads in accordance with the demand pattern of the power network customers. Experience has shown that the customer demand pattern is cyclic with distinct day and night patterns, week day/week end patterns and seasonal patterns.

The art is in need of an arrangement whereby the primary power generating reactor could be operated steadily at the average system power demand level.

SUMMARY OF THE INVENTION

The current invention answers this need for presenting an arrangement whereby the primary power source (nuclear reactor) can be operated at a constant full-rated level equal to the average power demand level, means are employed to store heat energy at high temperature during periods of low power demand and means are employed to retrieve the stored heat energy and use it to generate steam to operate the turbogenerators during periods of high power demand. The heat storage means may be selectively placed in or out of flow communication with the nuclear reactor and comprises a large enclosure containing salt (e.g., fluoride salts) having a high, sharp melting point and high latent heat of fusion. Means for retrieving the heat stored in the salt fusion heat storage enclosure comprises means for circulating a suitable liquid medium (immiscible with the molten salt) to the enclosure for contact with the molten salt and then to a steam boiler, which is in turn in flow communication with the steam turbine-generator combination.

BRIEF DESCRIPTION OF THE DRAWING

This invention will be better understood from the following description and drawings in which.

DESCRIPTION OF THE PREFERRED EMBODIMENT

Figure 1:
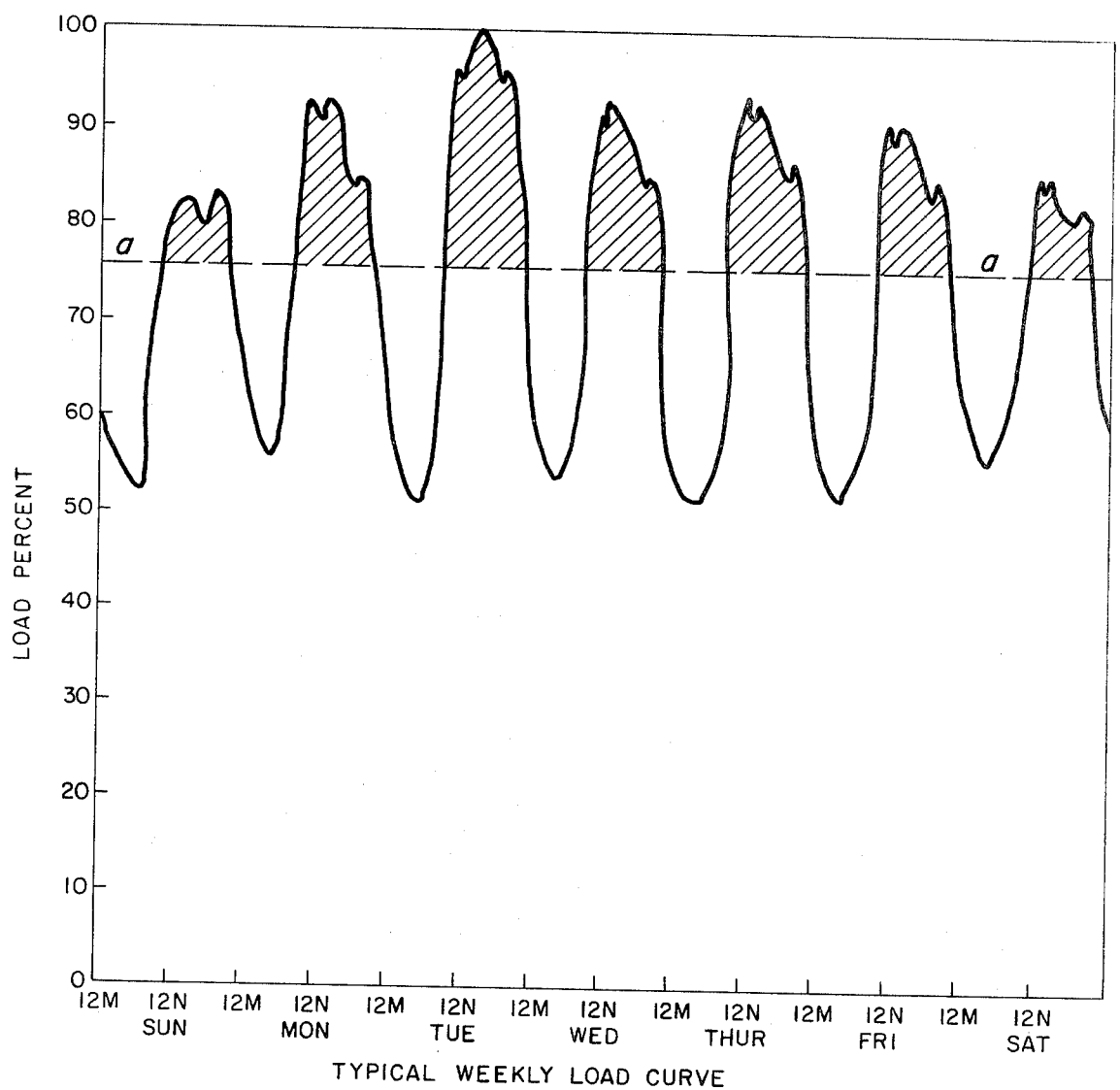
FIG. 1 is a typical weekly power load curve demonstrating the cyclic nature of power customer demand and FIG. 2 schematically illustrates the incorporation of the heat storage and retrieval system of the present invention into a conventional nuclear power generating plant.

A typical power demand curve displaying hour-by-hour power demand over a one-week period is shown in FIG. 1. As may be seen for this particular curve, portions (shaded areas) of the curve from each day reflect power demands in excess of the average (line $a-a$). As a result, in order to satisfy the maximum peak demand a nuclear reactor must be employed able to deliver at least 24 percent more load than is demanded of the system as an average power load.

By the practice of this invention, it is proposed to store heat energy from the nuclear reactor during the many periods of below-average power demand in order to have this heat energy available for generating auxiliary steam to meet the requirements of the above-average power demand periods. A nuclear reactor rated at about 76 percent of the maximum system load power required of the unit for the case of the FIG. 1 load demand could thus be utilized, thereby reducing the initial investment considerably and providing more efficient operation of the unit.

Figure 2:
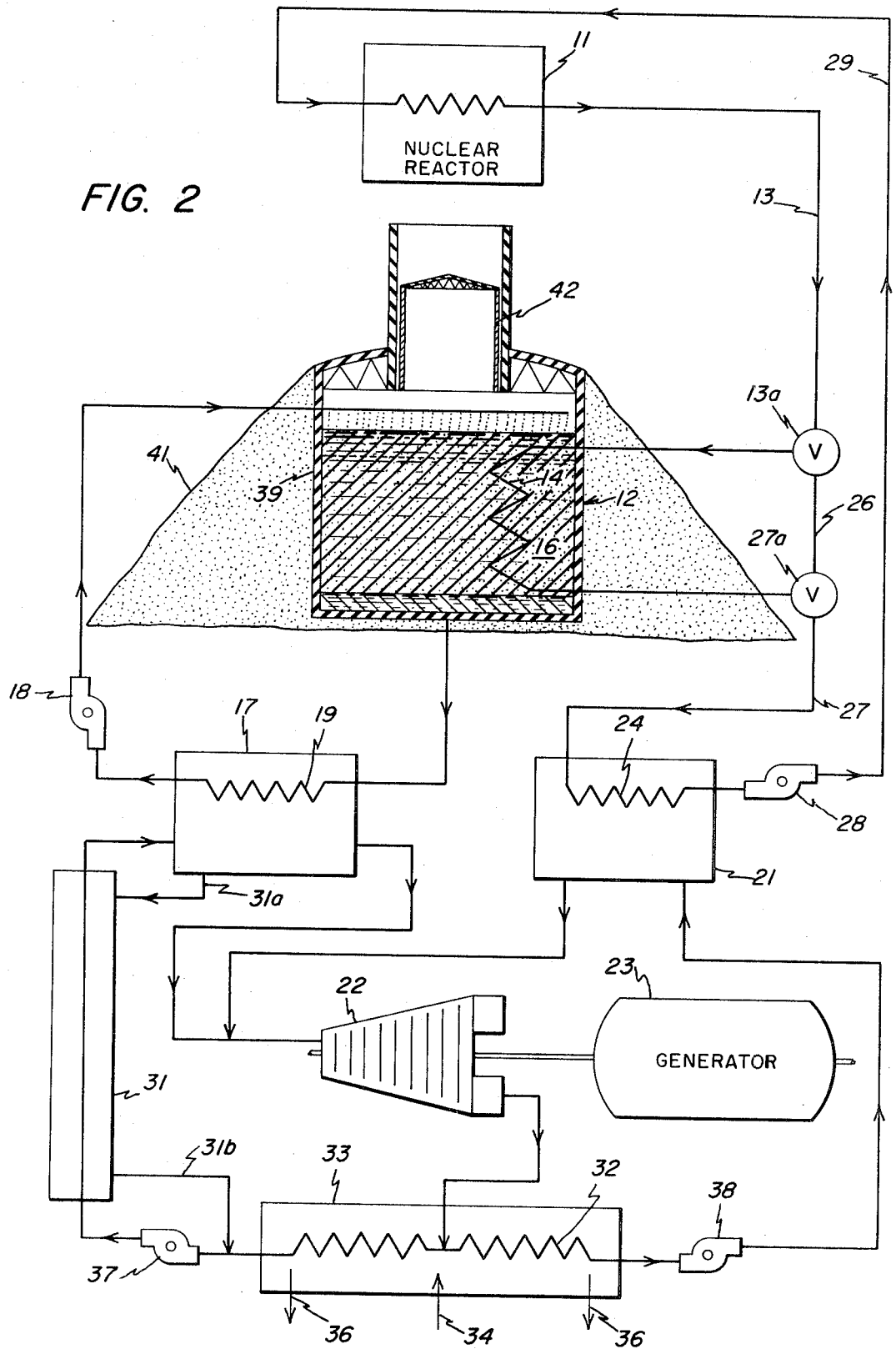

FIG. 2 schematically represents an arrangement in accordance with the current invention whereby a nuclear reactor (e.g., high temperature fuel rod gas reactor, breeder reactor, light water reactor, high temperature pebble bed gas reactor) servicing a widely fluctuating load can be designed to meet the average power demand (line $a-a$ of FIG. 1), rather than the maximum demand. By way of example, reactor 11 is a high temperature gas reactor (HTGR). High capacity heat storage unit 12 is adapted to be placed into flow communication with the hot fluid discharge conduit 13 of reactor 11 and is also connected to the heat recovery circuit. As will be developed in greater detail, reactor 11 can be operated at this load level (satisfying average power demand) regardless of the expected variations in consumer power demand.

When conduit 13 is placed in flow communication with heat storage unit 12 during low-load periods, the hot fluid discharge passes through heat exchanger 14 and the heat is absorbed at high temperature by melting some of the solid salt in the salt bath 16. Although heat exchanger 14 is schematically illustrated in the drawing, the preferred construction thereof would employ heat exchange tubes (not shown). No difficulty is encountered in inserting heat into salt bath 16 at a high rate, because solid salt that is present melts to a low viscosity liquid, which rapidly takes heat away from the heat exchange surface thereby maintaining good heat transfer.

However, the retrieval of heat from salt bath 16 poses a considerable problem. If solid head exchange surfaces are employed, as for example, heat exchange tubes, as heat is removed from the liquefied salt, the salt will solidify and plate out on the heat exchange surfaces. As the salt deposit builds up, the heat exchange efficiency is reduced quite rapidly. Because the heat to be removed from the system comes from the site of freezing (i.e., from the outside periphery of the solid salt buildup), the heat being removed would have to flow radially inward through the solid salt and through the pipe wall to the heat transfer medium. Solid salt is not generally a very good thermal conductor and, therefore, heat retrieval by the utilization of solid heat transfer surfaces is not very effective unless some simple mechanism can be found for continuously removing the solid salt from the heat transfer surface.

In accordance with this invention heat retrieval from the fused salt bath 16 is accomplished by the use of a metallic liquid that is immiscible with the fused salt. As the metallic liquid enters unit 12 above the high level of salt bath 16 it is sub-divided into globules and is permitted to permeate as globules through salt bath 16 to pick up heat. The heat retrieval liquid with its heat content is then collected and pumped from heat storage tank 12 to boiler 17 for the generation of steam with the heat content thereof and then returned to salt bath enclosure 12 for repetition of the permeation, heat-up and removal. In addition to being immiscible with the fused salt, the heat exchange liquid medium employed must 1) have a significantly different density from the density of the liquid salt so that it would rapidly pass through the fused salt; 2) be chemically stable and non-corrosive to any equipment with which contact is made in the heat retrieval cycle; 3) have a reasonably low viscosity to reduce pumping losses; 4) have a very low solubility for the salt or for the materials of which any of the components in the heat recovery cycle are constructed and 5) be relatively inexpensive. The preferred materials are liquid lead and liquid lead alloys. Such materials as mercury alloys and tin alloys may also be useful for this purpose, if certain problems with the use of pure mercury and tin can be overcome.

In the embodiment described in the drawing, liquid lead is pumped to heat bank 12 by pump 18, entering enclosure 12 at about 700°F. This "cooled" liquid lead is distributed over the top of the salt bath in large globules. The lead globules, being more dense than the liquid salt, will rapidly settle to the bottom of bath 16. In transit, lead globules are heated to the bath temperature and, as this is accomplished, each lead globule will gradually accumulate a surface covering of solid salt. This solid salt skin should be quite fragile and be readily broken by the dynamic periodic distortions of the individual lead globules as they pass down through salt bath 16, by the very significant thermal expansion of each lead globule and by the pronounced stirring effect caused by the movement of the very large volume of lead globules down through the molten salt bath 16. The high density and low viscosity of liquid lead in combination promote distortion of the falling lead spheres.

Thermal resistance of the very thin layers of solid salt that could accumulate before being shedded is negligible and, as a consequence, the lead globules become heated to very near the freezing temperature of the salt. The size of the lead globules can be adjusted to produce minimum transit time through salt bath 16 consistent with the desired temperature rise.

The heated liquid lead is then passed through heat exchanger 19 in boiler 17 for the generation of steam.

This steam together with steam from boiler 21 is used to operate turbine 22 for running generator 23. During heat retrieval conduit 13 will have been placed into direct flow communication with boiler 21.

Steam is generated in boiler 21 by the passage of hot helium gas discharge from reactor 11 through heat exchanger 24. As shown in the drawing, the hot helium gas passing through heat exchanger 24 either will come directly thereto via conduit 13, two-way valve 13a, conduits 26 two-way valve 27a and 27 (no heat storage being accommodated) or indirectly via conduit 13, heat exchanger 14, two-way valve 27a and conduit 27 (during heat storage). The cooled helium gas is returned to nuclear reactor 11 by pump 28 via line 29.

Feed water entering boiler 17 is at a temperature slightly above the melting point of lead (620°F) having been heated in pre-heater 31. Water for generating steam is discharged from turbine 22 at the low temperature end thereof and is passed into heat exchanger 32 in condenser 33. Cooling water enters and leaves condenser 33 as shown by the arrows 34 and 36. The low temperature steam from turbine 22 is condensed and, via pumps 37 and 38, is pumped to pre-heater 31 and boiler 21, respectively. The heating capability in pre-heater 31 is provided by hot water tapped (pipe 31a) from the boiler, as shown. The cooled conditioning water from pre-heater 31 is added (pipe 31b) to the stream leaving heat exchanger 32 to enter pump 37.

The heat storage material to be used in enclosure 12 must a. have a transition temperature (solid to liquid) that is below, but close to, the temperature of the hot fluid discharged from the nuclear reactor;

b. have a high latent heat of transformation;

c. be stable, susceptible of containment and preferably non-poisonous;

d. be able to conduct heat well enough to allow adequate efficient heat transfer between itself and the other heat transporting fluids of the system and e. be available in large quantities at reasonable cost.

Individual salts for use in suitable combinations or eutectics are shown in Table I. The preferred constituents are the fluoride salts, because they have high, sharply defined melting points and high latent heats of fusion. When salt combinations are selected for use the combination must be matched to the reactor system.

TABLE I

| Material | Mol. wt. g/mole | MP (°C) | Liq. Density g/cm$^3$ | Heat of Fusion | | | Spec. Heat at MP cal/g°C | | Fusion Ht. capac. BTU/ton | $\Delta V$ f/Vs |
|---|---|---|---|---|---|---|---|---|---|---|
| | | | | cal/g | cal/cm$^3(l)$ | BTU ft$^3(l)$ | Solid | Liquid | | |
| LiF | 25.94 | 860 | 1.83 | 92.5 | 169 | 1.91×10$^4$ | .561 | .597 | 3.33×10$^5$ | .294 |
| LiCl | 42.40 | 613 | 1.50 | 75.5 | 113 | 1.28×10$^4$ | .350 | .354 | 2.72×10$^5$ | .262 |
| NaF | 42.00 | 992 | 1.945 | 186. | 362 | 4.09×10$^4$ | .366 | .390 | 6.7 ×10$^5$ | .274 |
| NaCl | 58.44 | 808 | 1.555 | 116.5 | 181 | 3.18×10$^4$ | .260 | .274 | 4.2 × 10$^5$ | .250 |
| KF | 58.10 | 860 | 1.91 | 108. | 206 | 2.33×10$^4$ | .246 | .275 | 3.89×10$^5$ | .172 |
| KCl | 74.56 | 772 | 1.52 | 81.8 | 124 | 1.40×10$^4$ | .206 | .214 | 2.94×10$^5$ | .173 |
| RbF | 104.48 | 760 | 2.88 | 39.5 | 114 | 1.29×10$^4$ | — | ~.15* | 1.42×10$^5$ | .143 |
| RbCl | 120.94 | 715 | 2.25 | 36.4 | 82 | 0.93×10$^4$ | — | ~.13* | 1.31×10$^5$ | .135 |
| CsF | 151.91 | 684 | 3.65 | 16.1 | 59 | 0.67×10$^4$ | — | ~.105* | .58×10$^5$ | .100 |
| CsCl | 168.36 | 645 | 2.79 | 10.7 | 29 | 0.33×10$^4$ | .100 | .107 | .38×10$^5$ | .268 |
| CaF$_2$ | 78.08 | 1418 | 2.52 | 91.0 | 229 | 2.59×10$^4$ | — | ~.32 | 3.28×10$^5$ | |
| CaCl$_2$ | 111.00 | 772 | 2.08 | 61.1 | 127 | 1.44×10$^4$ | — | .213 | 2.20×10$^5$ | .001 |
| MgF$_2$ | 62.31 | 1263 | 2.43 | 223 | 541 | 6.12×10$^4$ | — | ~.26* | 8.04×10$^5$ | |
| MgCl$_2$ | 95.23 | 705 | 1.68 | 108. | 182 | 2.05×10$^4$ | — | .231 | 3.89×10$^5$ | .305 |
| ZnCl$_2$ | 136.29 | 262 | 2.39 | 40.4 | 96.5 | 1.09×10$^4$ | .177 | ~.184* | 1.45×10$^5$ | .116 |
| ZnF$_2$ | 103.37 | 872 | ~3.9* | 55* | 215* | 2.43×10$^4$ | — | ~.240* | ~2.0*×10$^5$ | |
| FeF$_2$ | 93.85 | 1110 | ~3.3* | 111* | 366* | 4.13*×10$^4$ | — | ~.265* | ~4.0*×10$^5$ | |
| FeCl$_2$ | 126.75 | 677 | ~2.4* | 81.1 | 195 | 2.20×10$^4$ | .193 | ~.197* | 2.92×10$^5$ | |
| Na$_2$CO$_3$ | 105.99 | 854 | 1.97 | 75.5 | 149 | 1.68×10$^4$ | — | .435 | 2.72×10$^5$ | |
| Na$_2$SO$_4$ | 142.06 | 890 | 2.07 | 40.7 | 84.5 | .955×10$^4$ | — | ~.32 | 1.46×10$^5$ | |

*Estimated by analogy with comparable salts of known values.

There are many eutectic mixes of the salts listed in Table I, which can operate in the range 600° to 700°C for use with a high temperature gas reactor. A number of binary eutectic mixes useful with high temperature gas reactors are set forth in Table II.

TABLE II

| Composition (molar) | MP (°C) | °F | HEAT OF FUSION Approx. BTU/ft³ | Approx. BTU/ton |
|---|---|---|---|---|
| 55 RbF – 45 LiF | 470 | 880 | $1.57 \times 10^4$ | $2.28 \times 10^5$ |
| 37 LiF – 63 CsF | 475 | 890 | $1.13 \times 10^4$ | $1.60 \times 10^5$ |
| 50 LiF – 50 KF | 500 | 930 | $2.12 \times 10^4$ | $3.61 \times 10^5$ |
| 67 NaF – 33 ZnF$_2$ | 635 | 1180 | $3.54 \times 10^4$ | $5.15 \times 10^5$ |
| 60 LiF – 40 NaF | 652 | 1200 | $2.79 \times 10^4$ | $4.68 \times 10^5$ |
| 50 NaCl – 50 KCl | 658 | 1220 | $2.29 \times 10^4$ | $3.57 \times 10^5$ |
| 70 NaF – 30 FeF$_2$ | 680 | 1260 | $4.10 \times 10^4$ | $5.90 \times 10^5$ |
| 40 NaF – 60 KF | 710 | 1310 | $3.04 \times 10^4$ | $5.01 \times 10^5$ |

The 70 NaF·30 FeF$_2$ eutectic is preferred as the heat storage medium for the arrangement set forth herein in combination with a high temperature fuel rod-type gas reactor. The 48 NaCl·52 CaCl$_2$ eutectic (melting point 500°C) would be well-matched for use with a breeder reactor. A NaF-MgF$_2$ eutectic mixture melting at 832°C would be very well matched to present high temperature helium cooled pebble reactor technology.

Experience with molten fluoride eutectics has established that these materials can be contained satisfactorily in mild steel containers, provided that oxygen and water vapor are kept away from the hot salt. Fortunately, the viscosity of the molten salts is low (like that of water) and a considerable decrease in density occurs upon melting. These features together with a good thermal expansion coefficient in the liquid phase provides very active convection. Such convection can provide excellent heat transfer. This capability enables the insertion of heat to, and withdrawal of heat from, the storage system at an acceptable rate (e.g., heat flux of about 800 megawatts thermal for a period of 12 hours).

Thus, assuming a 33 percent thermo-electric efficiency, to generate 1000 MW$_{elec}$(maximum), a 2400 MW$_{therm}$HTGR would be required in conjunction with a heat storage system able to receive a heat input flux of at least about 600 MW$_{thermal}$ for a period of 12 hours and to provide a heat release flux of 600 MW$_{thermal}$ for a period of 12 hours. High pressure helium would be used as the heat transfer fluid circulating between reactor 11 and the steam boiler 21.

Steam from the boilers would be at 2512 psi, 1005°F (540°C); helium entering reactor would be at 750 psi, 760°F (400°C); helium leaving reactor would be at 686 psi 1430°F (773°C) and the required helium flow rate would be $3.4 \times 10^6$ lbs (mass) per hour.

The temperature at which the heat should be stored in salt bath 16 should be as high as possible, consistent with getting the heat in and out of the salt bath at the required rates, in order to deliver the heat to boiler 21 at the highest possible temperature. To satisfy these requirements it is necessary, during the heat storage phase to pass all of the helium from reactor 11 through the heat storage unit so as to lower its temperature by about one-fourth of the available total temperature drop of the helium; that is, $\frac{1}{4}(1430 - 760) = 167°F$. Thus, in traversing the heat bank the helium temperature would drop from 1430°F to about 1260°F. Therefore, the heat storage material utilized should provide a sharp, reversible, phase transition with a high heat of transformation at about 1260°F (680°C).

In a heat bank suitable for a nuclear reactor having the parameters set forth above and using 70 NaF·30 FeF$_2$ salt eutectic about $8.0 \times 10^4$ tons of salt would be required (corresponding to a volume in the liquid state of about $8.5 \times 10^5$ cubic feet). Containment of such a volume would require a tank 110 ft. high and (allowing for the space occupied by heat exchange tubes manifolds, etc.) approximately 110 ft. in diameter.

The steel shell is surrounded by thermal insulation 39 such as mineral wool, for example. To insure that the thermal insulation would remain dry, the entire structure would be set up well above general ground level and be surrounded with dry sand 41. Adequate ground water barriers and surface drainage would be built into the sand structure.

Pumping facilities for the liquid lead could be a linear induction motor with the liquid lead itself serving as a moving armature. To carry the required heat flux of $2 \times 10^9$ BTU's/hour (working between the temperature of 1250°F and 700°F) requires a lead flux of $1.7 \times 10^8$ lbs./hr. With a flow velocity of 7 ft/sec in the transfer pipes, the cross sections of the pipe would be about 10 sq. ft. Approximately $10 \times 10^6$ lbs of lead would be required to fill the heat retrieval circuit, there being about $2.4 \times 10^6$ lbs (3500 cubic feet) of lead in transit in the salt bath at any moment. This massive downflow would, of course, create a tremendous stirring effect, which is of considerable benefit in optimizing heat transfer and breaking down of the lead globules.

The pneumatic bell 42, able to float up and down as required, accommodates the change of volume of the salt bath 16 as change of phase occurs during heat storage and heat retrieval. As an alternate, enclosure 12 could be made with a rigid top and gas to compensate for the volume change would be pumped in and out of a large, insulated container (not shown) as needed.

What I claim as new and desire to secure by Letters Patent of the United States is:

1. In a power plant for generating electricity in which a source of high temperature fluid under pressure is in flow communication with a steam boiler in which heat from said high temperature fluid is used to generate steam for operation of the steam turbine used to drive a generator, the improvement in combination with the source of high temperature fluid and the steam boiler comprising:

a. a heat storage enclosure containing a mass of a salt material having a melting point of about, and less than, the temperature of the high temperature fluid, b. heat exchange means located in said enclosure in contact with said mass, c. means connected to said heat exchange means for selectively placing said heat exchange means into and out of flow communication with the source of high temperature fluid, d. means connected to said heat exchange means for selectively placing said heat exchange means into and out of flow communication with the steam boiler, e. a second boiler in flow communication with the steam turbine and f. means for circulating said fluid heat exchange material into direct contact with said mass for receiving heat therefrom and then to said second boiler for the generation of steam with the heat carried thereby.

2. The improvement of claim 1 wherein the source of high temperature fluid under pressure is a nuclear reactor.

3. The improvement of claim 2 wherein the nuclear reactor is a high temperature gas reactor.

4. The improvement of claim 3 wherein the salt material is the 70 NaF·30 FeF$_2$ eutectic.

5. The improvement of claim 3 wherein the salt material is a NaF·MgF$_2$ base eutectic.

6. The improvement of claim 1 wherein the fluid heat exchange material is a liquid metal.

7. The improvement of claim 6 wherein the circulating means includes means for dividing the liquid metal into globules.

8. The improvement of claim 6 wherein the fluid heat exchange material is liquid lead.

9. The improvement of claim 6 wherein means is provided to preheat the water feed to the second boiler.

10. The improvement of claim 1 wherein the enclosure is provided with volume expansion means in communication therewith.

11. The improvement of claim 1 wherein the enclosure is thermally insulated.

12. A process for the generation of electricity comprising the steps of:
   a. continuously heating a fluid to high temperature in a nuclear reactor under pressure,
   b. bringing the high temperature fluid into heat exchange relationship with a mass of salt material for a preselected period of time to cause melting of a quantity thereof as heat is transferred thereto,
   c. conducting the cooled high temperature fluid to a first boiler to generate steam,
   d. passing the steam so generated to a steam turbine for driving a generator,
   e. conducting the high temperature fluid directly from said nuclear reactor to said first boiler after termination of said preselected period of time,
   f. bringing a fluid heat exchange material into direct contact with the molten salt material for a second preselected period of time to cause solidification of a quantity thereof as heat is removed therefrom and transferred to the fluid heat exchange material,
   g. conducting the heated fluid heat exchange material to a second boiler to generate steam,
   stopping the bringing of fluid heat exchange material into contact with the salt material and
   i. repeating the steps b), c), d), e), f), g) and h) above 13. The process recited in claim 12 wherein the steam generated in the second boiler is passed to the same steam turbine as receives steam from the first boiler.

14. The process recited in claim 13 wherein the total steam input to the steam turbine is substantially greater than the steam input from the first boiler alone.

15. The process recited in claim 12 whrein the fluid heat exchange material is a metallic liquid.

16. The process recited in claim 15 wherein the metallic liquid is liquid lead introduced into the salt material is globules.

17. The process recited in claim 12 wherein the temperature of the steam from the second boiler is at least about 1000°F.

18. The process recited in claim 12 wherein the nuclear reactor is a high temperature gas reactor and the salt material is 70 NaF·30 FeF$_2$.

19. The process recited in claim 12 wherein the nuclear reactor is a high temperature gas reactor and the salt material is a NaF·MgF$^2$ base eutectic.

20. The process recited in claim 12 wherein each preselected period of time is about 12 hours.

* * * * *